(12) United States Patent
Tashiro

(10) Patent No.: US 7,395,935 B2
(45) Date of Patent: Jul. 8, 2008

(54) FILTERING DEVICE

(75) Inventor: Minoru Tashiro, Tokyo (JP)

(73) Assignee: Bunri Incorporation, Miyazaki (JP)

( * ) Notice: Subject to any disclaimer, the term of this patent is extended or adjusted under 35 U.S.C. 154(b) by 0 days.

(21) Appl. No.: 11/905,778

(22) Filed: Oct. 4, 2007

(65) Prior Publication Data

US 2008/0035554 A1 Feb. 14, 2008

Related U.S. Application Data

(63) Continuation of application No. PCT/JP2007/053192, filed on Feb. 21, 2007.

(30) Foreign Application Priority Data

Feb. 23, 2006 (JP) ............................ 2006-046869

(51) Int. Cl.
*B01D 33/06* (2006.01)
*B01D 33/44* (2006.01)
(52) U.S. Cl. .................... 210/396; 210/402; 210/408
(58) Field of Classification Search ............... 210/396, 210/402, 403, 404, 408
See application file for complete search history.

(56) References Cited

U.S. PATENT DOCUMENTS

| | | | | |
|---|---|---|---|---|
| 4,437,991 A | * | 3/1984 | Tashiro | 210/413 |
| 4,442,002 A | * | 4/1984 | Morris | 210/411 |
| 4,957,630 A | * | 9/1990 | Bratten | 210/358 |
| 5,110,461 A | * | 5/1992 | Abel | 210/158 |
| 5,217,613 A | * | 6/1993 | Tashiro et al. | 210/396 |
| 6,332,983 B1 | * | 12/2001 | Tashiro et al. | 210/297 |

FOREIGN PATENT DOCUMENTS

| | | | |
|---|---|---|---|
| JP | 60-179316 | | 11/1985 |
| JP | 4-33929 | | 8/1992 |
| JP | 6-21708 | | 3/1994 |
| JP | 7-246539 A | | 9/1995 |
| JP | 9-24257 | * | 1/1997 |
| JP | P2000-210506 | * | 8/2000 |
| JP | P2003-11031 | * | 1/2003 |
| JP | 2005-66820 A | | 3/2005 |

OTHER PUBLICATIONS

International Search Report dated Jun. 5, 2007 established in International Application No. PCT/JP2007/053192.

* cited by examiner

*Primary Examiner*—Fred Prince
(74) *Attorney, Agent, or Firm*—Bacon & Thomas, PLLC (57) ABSTRACT

A filter device is provided with a filter tank, a filter drum disposed in the filter tank, and a drive mechanism which rotates the filter drum. The filter element is composed of a porous plate that is formed with a large number of circulation holes. The porous plate is formed into a cylindrical shape. An inlet port opens in an outer peripheral surface of the porous plate. An outlet port opens in an inner peripheral surface of the porous plate. The circulation hole is formed by etching. A smallest opening of the circulation hole is formed between the inlet port and an intermediate part with respect to a plate thickness direction. An opening width of the circulation hole increases from the smallest opening toward the outlet port to form a tapered shape.

10 Claims, 7 Drawing Sheets

FILTERING DEVICE

CROSS-REFERENCE TO RELATED APPLICATIONS

This is a Continuation Application of PCT application No. PCT/JP2007/053192, filed Feb. 21, 2007, which was published under PCT Article 21(2) in Japanese.

This application is based upon and claims the benefit of priority from prior Japanese Patent Application No. 2006-046869, filed Feb. 23, 2006, the entire contents of which are incorporated herein by reference.

BACKGROUND OF THE INVENTION

1. Field of the Invention

The present invention relates to a filter device for decontaminating a contaminated fluid in which chips, fine sludge, etc., are mixed, for example.

2. Description of the Related Art

A machine tool or the like for machining, such as cutting, grinding, etc., uses a fluid such as a coolant for cooling a workpiece. This fluid is mixed with foreign matter, such as chips produced by machining, fine sludge, etc. In order to reuse the contaminated fluid that contains the chips, sludge, etc., a filter device is used to remove the chips, sludge, etc., from the contaminated fluid.

The inventors hereof have long been investigating and developing filter devices and developed, as part of them, a filter device that uses a filter element formed of a punching metal. For example, a punching-metal filter element is described in Jpn. UM Appln. KOKOKU Publication No. 4-33929. In manufacturing the punching metal, a large number of punch holes are bored through a metal plate by means of a press die that has a large number of pins. These punch holes are formed at predetermined pitches in the metal plate. This punching metal is formed into a cylindrical shape and set in a filter tank. As a contaminated fluid flows from the outer peripheral side of the filter element to the inner peripheral side, chips and the like that are contained in the contaminated fluid adhere to the punch holes.

The punch holes of the punching-metal filter element are formed by means of the press die that has the large number of pins. The punch holes that are punched out by the pins of the die have an inner surface that is straight in the thickness direction of the metal plate. The inner surface of the punch holes is rugged, having shear marks and the like. Inevitably, moreover, openings of the punch holes are subject to projections such as burrs. In this filter element, chips are liable to stick in or be caught by the punch holes, so that the chips cannot be disengaged with ease. In some cases, therefore, the chips may fail to be removed by only rubbing the surfaces of the filter element with a scraper blade, so that clogging may occur.

In order to form the punch holes in the metal plate with use of the die that is provided with the large number of pins, moreover, a relatively soft material must be used as the metal plate for the punching metal. Therefore, the punching-metal filter element has low stiffness and is easily deformable. Depending on the contact state of the scraper blade for removing the chips adhering to the filter element, the punching metal may be deformed, thus leaving room for improvement.

BRIEF SUMMARY OF THE INVENTION

Accordingly, the object of the present invention is to provide a filter device in which chips and the like in a contaminated fluid can be easily separated from a filter element, so that clogging cannot occur with ease.

A filter device of the present invention comprises a filter tank stored with a contaminated fluid which contains chips, a filter drum rotatably disposed in the filter tank and immersed in the contaminated fluid, and a drive mechanism which rotates the filter drum around the axis of the filter drum. The filter drum includes a filter element which is produced by forming a porous plate having a large number of circulation holes therein into a cylindrical shape, such that an inlet port of each of the circulation holes opens in the peripheral surface of the porous plate and that an outlet port opens in an inner peripheral surface of the porous plate. The circulation holes of the porous plate are formed by etching and have a shape such that a smallest opening is formed in a cross section of the porous plate in the thickness direction thereof so that the opening width thereof is minimum between the inlet port and an intermediate part with respect to the plate thickness direction, that the opening width gradually increases from the smallest opening toward the outlet port, and that the opening width is maximum at the outlet port.

According to the present invention, the circulation holes of the porous plate that functions as the filter element are formed by etching and have a shape such that the smallest opening is formed so that the opening width thereof is minimum between the inlet port and the intermediate part with respect to the plate thickness direction, and that the opening width gradually increases from the smallest opening toward the outlet port to form a tapered shape. Therefore, chips and the like in the contaminated fluid cannot be easily sticked in the porous plate and are ready to separate from the porous plate. The chips and the like that adhere to the filter element easily exfoliate without clogging the circulation holes. When the filter element rotates, therefore, they can easily exfoliate from the filter element. The exfoliated chips and the like are scraped out toward an exit section by a scraper conveyor, for example.

In a preferred form of the present invention, the inlet port is formed with the smallest opening and the outlet port is formed with the largest opening. If the circulation holes are circular, the inside diameter of the smallest opening should be greater than the thickness of the porous plate.

In a preferred form of the present invention, the filter drum may be formed into a cylindrical shape, a scraper blade may be located adjacent to the outer peripheral surface of the filter drum, and a distal end of the scraper blade may extend in the direction of the axis of the filter drum so as to be in contact with or in close vicinity to the outer peripheral surface of the filter drum. The filter tank may include a filter tank body which accommodates the scraper conveyor and a filter accommodation chamber which is located beside the filter tank body. In a preferred form of the present invention, the filter drum is accommodated in the filter accommodation chamber.

DETAILED DESCRIPTION OF THE INVENTION

A filter device according to a first embodiment of the present invention will now be described with reference to FIGS. 1 to 4.

Figure 1:
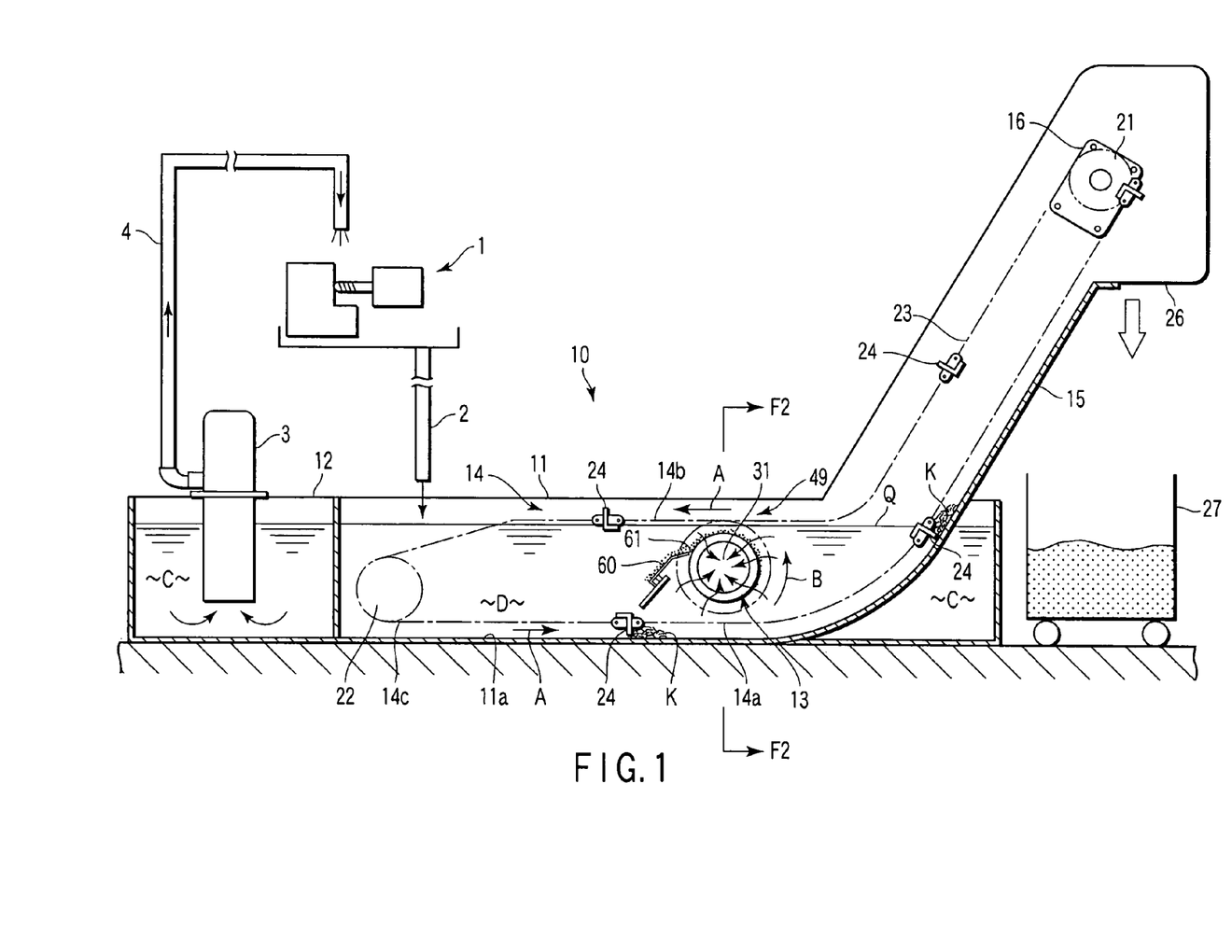
FIG. 1 is a sectional view of a filter device according to a first embodiment of the present invention.

FIG. 1 shows an outline of a contaminated fluid recovery apparatus. The contaminated fluid recovery apparatus is used to remove foreign matter from a coolant used in a machine tool 1, such as a machining center, thereby making the coolant reusable. The contaminated coolant discharged from the machine tool 1 is an example of the contaminated fluid D. Mixed in the contaminated fluid D are chips of an aluminum alloy, chips of a ferrous metal and the like, fine particles of a nonmetal such as carbon, etc., which are produced by cutting or the like.

The contaminated fluid D is fed from the machine tool 1 to a filter device 10 through a discharge passage 2. The contaminated fluid D is decontaminated by the filter device 10. A cleaned fluid C that is decontaminated by the filter device 10 is fed again to the machine tool 1 through a supply passage 4 after being pumped up by a pump 3.

Figure 2:
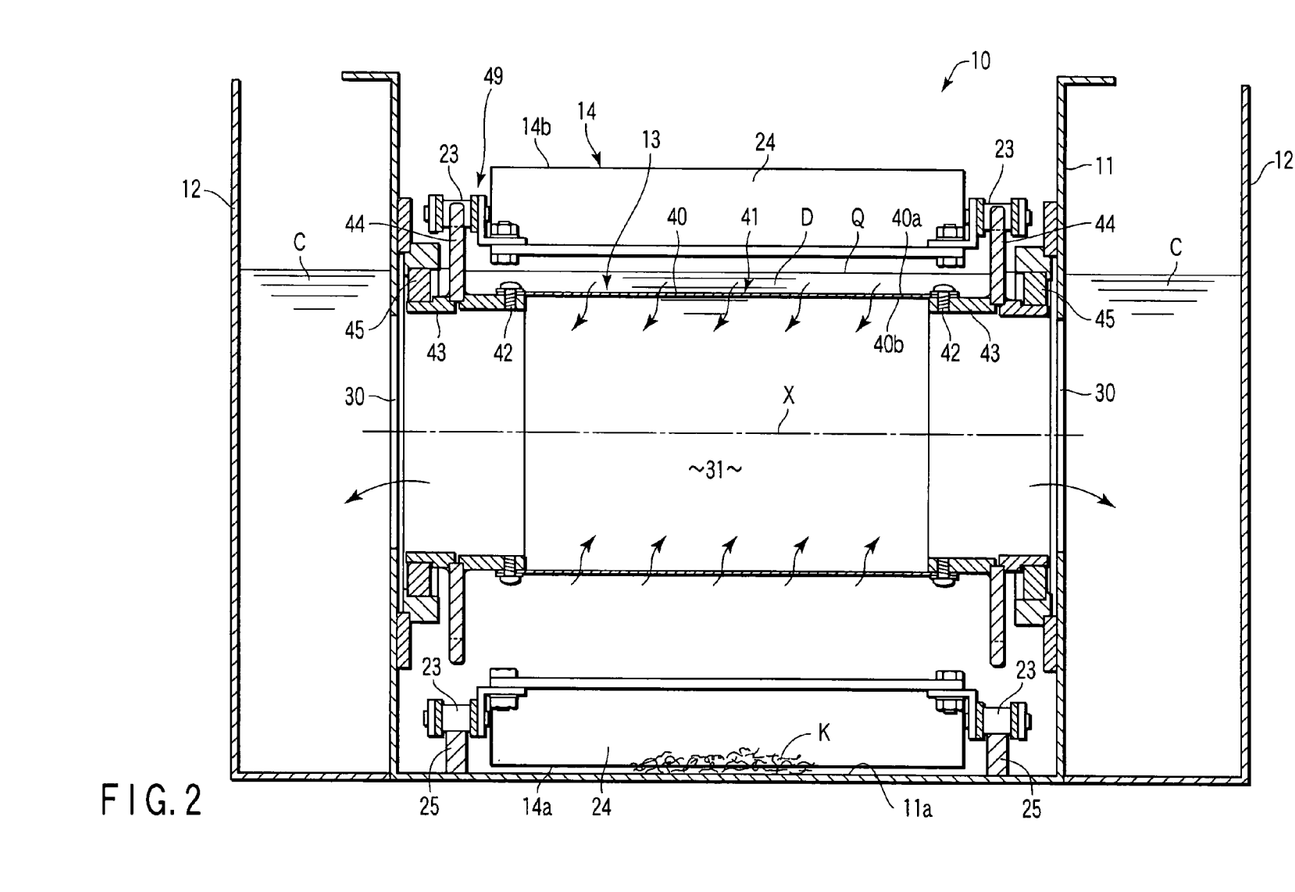
FIG. 2 is a sectional view of the filter device taken along line F2-F2 of FIG. 1.

The following is a detailed description of the filter device 10. As shown in FIGS. 1 and 2, the filter device 10 includes a filter tank 11, which contains the contaminated fluid D, a clean tank 12, a filter drum 13, a scraper conveyor 14, etc. The clean tank 12 is formed adjacent to the filter tank 11. The filter drum 13 is located inside the filter tank 11. The contaminated fluid D is fed from the discharge passage 2 into the filter tank 11. A scooping section 15 that extends diagonally upward is formed at an end portion of the filter tank 11. A rotary drive mechanism 16 that has a motor as its drive source is provided at the top of the scooping section 15.

The scraper conveyor 14 is located ranging from a bottom portion 11a of the filter tank 11 to the scooping section 15. The scraper conveyor 14 includes chains 23 and a plurality of scrapers 24. The scrapers 24 are attached to the chains 23. The chains 23 endlessly travel between an upper sprocket 21 and a lower sprocket 22. The chains 23 are moved in the direction indicated by arrow A in FIG. 1 by the rotary drive mechanism 16. The chains 23 are guided in movement in the direction of arrow A by guide members 25 (shown in FIG. 2), which are located on the bottom portion 11a or the like of the filter tank 11.

The scrapers 24 are arranged at predetermined intervals in the longitudinal direction of the chains 23. As typically shown in FIG. 2, chips K settle on the bottom portion 11a of the filter tank 11. The chips K, along with sludge and the like, are carried out into an exit section 26 through the scooping section 15 by the scrapers 24. The exit section 26 is located outside the filter tank 11. The exit section 26 is situated in a position higher than a fluid surface Q of the filter tank 11. The chips K, sludge, etc., having reached the exit section 26, drop from the exit section 26 toward a recovery box 27.

The scraper conveyor 14 includes a lower portion (outward portion) 14a and an upper portion (inward portion) 14b. The lower portion 14a of the scraper conveyor 14 moves along the bottom portion 11a of the filter tank 11 toward the exit section 26. The upper portion 14b of the scraper conveyor 14 moves from the exit section 26 toward a starting end 14c of the lower portion 14a, that is, toward a lower sprocket 22, via a region over the lower portion 14a.

The filter drum 13 is arranged horizontally between the lower portion 14a and the upper portion 14b of the scraper conveyor 14. As shown in FIG. 2, the filter tank 11 is formed having openings 30 in positions that individually face the opposite ends of the filter drum 13. The clean tank 12 communicates with an interior 31 of the filter drum 13 through the openings 30. Thus, the cleaned fluid C that is introduced into the interior 31 of the filter drum 13 flows into the clean tank 12 through the openings 30.

The filter drum 13 is provided with a filter element 41, short cylindrical end members 43, sprockets 44 on the end members 43, etc. The filter element 41 is formed by rolling a porous plate 40, which will be described later, into a cylinder. The end members 43 are fixed individually to the opposite end portions of the filter element 41 by means of fixing components 42 (shown in FIG. 2), such as screws. The filter tank 11 is provided with bearings 45. The filter drum 13 is supported for rotation around the horizontal axis X by bearings 45. The entire periphery of the filter drum 13 is immersed in the contaminated fluid D. Thus, the filter drum 13 rotates in the contaminated fluid D.

The chains 23 of the scraper conveyor 14 engage the respective upper parts of the sprockets 44. When the scraper conveyor 14 moves in the direction of arrow A in FIG. 1, therefore, the filter drum 13 rotates in the direction indicated by arrow B. The rotary drive mechanism 16 for moving the scraper conveyor 14 serves also as a drive mechanism 49 for rotating the filter drum 13.

Figure 3:
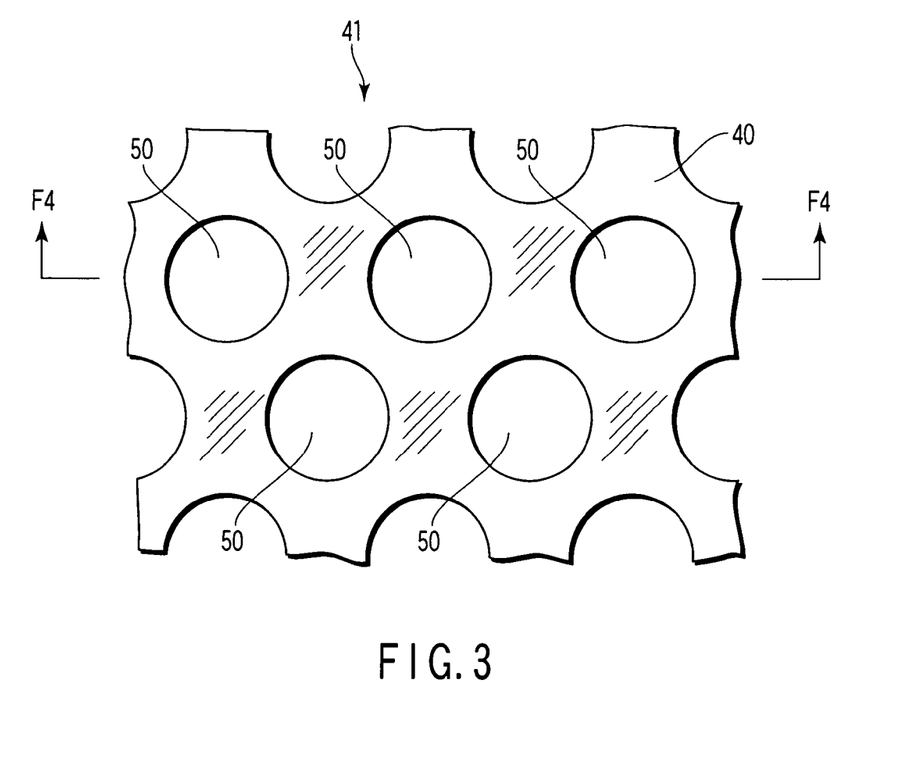
FIG. 3 is a plan view of a part of a porous plate of a filter drum shown in FIG. 2.
Figure 4:
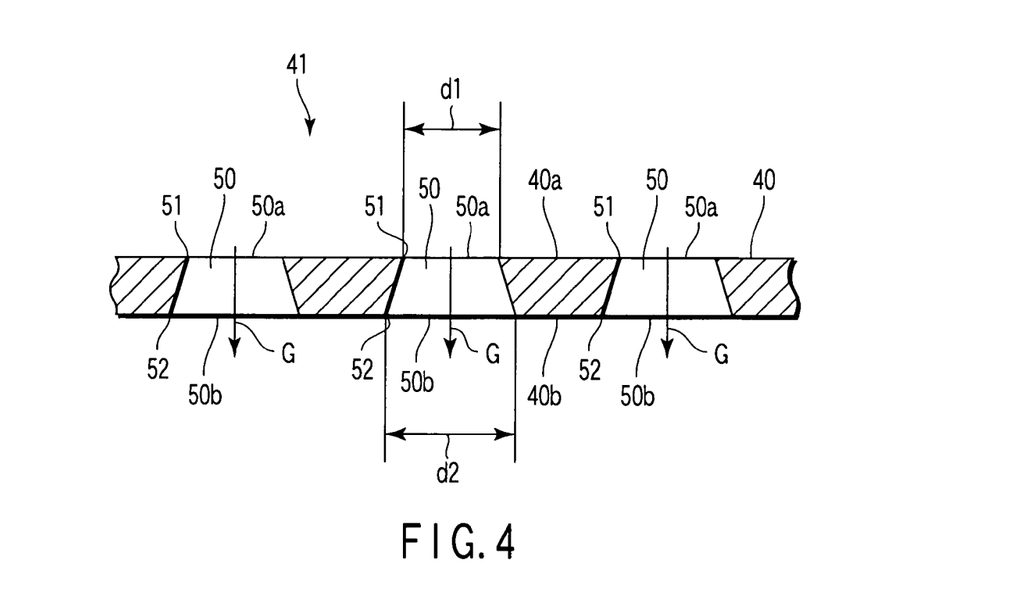
FIG. 4 is a sectional view of the part of porous plate taken along line F4-F4 of FIG. 3.

As shown in FIG. 3, the porous plate 40 that functions as the filter element 41 has a large number of circulation holes 50 that are formed at predetermined pitches. Although these circulation holes 50 are individually circular, circulation holes of any other shapes than a circular shape may be adopted instead. As shown in FIG. 4, an inlet port 50a opens in one surface (outer peripheral surface 40a) of the porous plate 40 that is situated on the outer peripheral side when the porous plate 40 is rolled into a cylinder. An outlet port 50b opens in the other surface (inner peripheral surface 40b) of the porous plate 40 that is situated on the inner peripheral side. In FIG. 4, arrows G indicate a direction in which the contaminated fluid flows through the circulation holes 50.

In a cross section of the porous plate 40 in its thickness direction, as shown in FIG. 4, the opening width of each circulation hole 50 is minimum at the inlet port 50a and increases toward the outlet port 50b. Thus, the cross section of the circulation hole 50 is tapered so that the opening width increases from the inlet port 50a toward the outlet port 50b. A smallest opening 51 having the smallest inside diameter d1 is formed at the inlet port 50a. A largest opening 52 having the largest inside diameter d2 is formed at the outlet port 50b. The circulation holes 50, each having this cross-sectional shape, can be formed by corroding a metal plate (material of the porous plate 40) by etching from one side. An example of etching is photo-etching based on the use of a photo-resist coating and an acid liquid.

An example of the thickness of the porous plate 40 is 0.15 mm. The inside diameter (pore diameter) of the smallest opening 51 is greater than the thickness of the porous plate 40 and ranges from $\phi$0.2 to 0.25 mm, for example. However, some other plate thicknesses and pore diameters than the aforesaid ones may be adopted depending on the filtering accuracy, flow rate, and other conditions.

As shown in FIG. 1, a scraper blade 60 is located adjacent to the outer peripheral surface of the filter drum 13. A distal end 61 of the scraper blade 60 is in contact with or in close vicinity to the outer peripheral surface of the filter drum 13. The distal end 61 of the scraper blade 60 extends in the direction of the axis X (horizontal direction) of the filter drum 13.

The circulation holes 50 of the porous plate 40 are formed by etching. Therefore, a very thin metal plate with high hardness may be used as a material of the porous plate 40. An example metal plate is a stainless-steel spring material that has hardness about twice that of a conventional stainless steel plate. The filter element 41, which is formed by rolling the porous plate 40 into a cylinder, has great stiffness despite its thinness. Therefore, the distal end 61 of the scraper blade 60 is not susceptible to deformation even when it comes into contact with the filter element 41. In other words, the thickness of the porous plate 40 can further be made less than that of a conventional filter element that is formed of a punching metal. Since the plate thickness can be reduced, the diameter of the circulation holes 50 can further be made less than that of conventional ones, so that the filtering accuracy can be increased considerably.

The following is a description of the operation of the filter device 10 constructed in this manner.

The contaminated fluid D discharged from the machine tool 1 is fed into the filter tank 11 through the discharge passage 2. The contaminated fluid D fed into the filter tank 11 passes through the circulation holes 50 of the porous plate 40 at a relatively low speed, starting from the outer peripheral side of the filter drum 13, and flows into the interior 31 of the filter drum 13. As this is done, chips and the like adhere to regions near the inlet ports 50a of the circulation holes 50. Fine particles and the like in the contaminated fluid D also stay near the inlet ports 50a by, for example, adhering to the chips. Thus, the cleaned fluid C flows slowly into the interior 31 of the filter drum 13.

The cleaned fluid C decontaminated by the filter drum 13 flows from the interior 31 of the filter drum 13 into the clean tank 12 through the openings 30. The cleaned fluid C that is guided into the clean tank 12 is pumped up by the pump 3 and fed again to the machine tool 1 through the supply passage 4.

As the filter drum 13 rotates, the chips K adhering to the outer peripheral surface of the filter drum 13 are scraped off by the distal end 61 of the scraper blade 60. The scraped-off chips K drop onto the bottom portion 11a of the filter tank 11. The chips K and the like deposited on the bottom portion 11a of the filter tank 11 are scraped out toward the exit section 26 by the scraper conveyor 14.

In the present embodiment, the circulation holes 50 are formed by etching. Besides, the smallest opening 51 is formed in each inlet port 50a, and the opening width increases from the smallest opening 51 toward the outlet port 50b to form a tapered shape. The opening width is maximum at the outlet port 50b.

Thus, the circulation holes 50 shown in FIG. 4 are not subject to any "burrs" that the conventional punching-metal filter element suffers. The inner surface of each circulation hole 50 is smooth without suffering any irregularities such as shear marks. Further, it has a tapered shape such that it spreads from the inlet port 50a to the outlet port 50b. Thus, the chips cannot be sticked in the porous plate 40, so that clogging does not readily occur. Even if chips and the like adhere to the outer peripheral surface 40a of the porous plate 40, moreover, these chips and the like cannot easily stick in the porous plate 40.

As the filter drum 13 rotates in the contaminated fluid D, the chips or the like adhering to the porous plate 40 move together with the outer peripheral surface of the filter drum 13 in the contaminated fluid D. As the filter drum 13 rotates, the contaminated fluid D that relatively flows around the filter drum 13 comes into contact with the chips and the like. While the filter drum 13 is rotating, moreover, the chips are urged to separate from the lower surface of the filter drum 13 by their own weight. Further, the chips and the like are subjected to a centrifugal force or the like that is caused by the rotation of the filter drum 13. For these reasons, the chips and the like adhering to the filter drum 13 settle down toward the bottom portion 11a of the filter tank 11.

As the scrapers 24 move near the filter drum 13 in the contaminated fluid D, furthermore, a flow of the contaminated fluid D is generated. This flow of the contaminated fluid D promotes the chips and the like to separate from the filter drum 13.

Thus, the chips and the like are allowed easily to separate from the filter drum 13. If the distal end 61 of the scraper blade 60 is kept apart from the filter drum 13, therefore, the chips adhering to the outer peripheral surface of the filter drum 13 exfoliate from the filter drum 13 the moment the chips come into contact with the distal end 61 of the scraper blade 60. Depending on the conditions, the chips and the like can be separated from the filter drum 13 without using the scraper blade 60. The chips K that are separated from the filter drum 13 and settled on the bottom portion 11a of the filter tank 11 can be conveyed toward the exit section 26 by the scraper conveyor 14.

Figure 5:
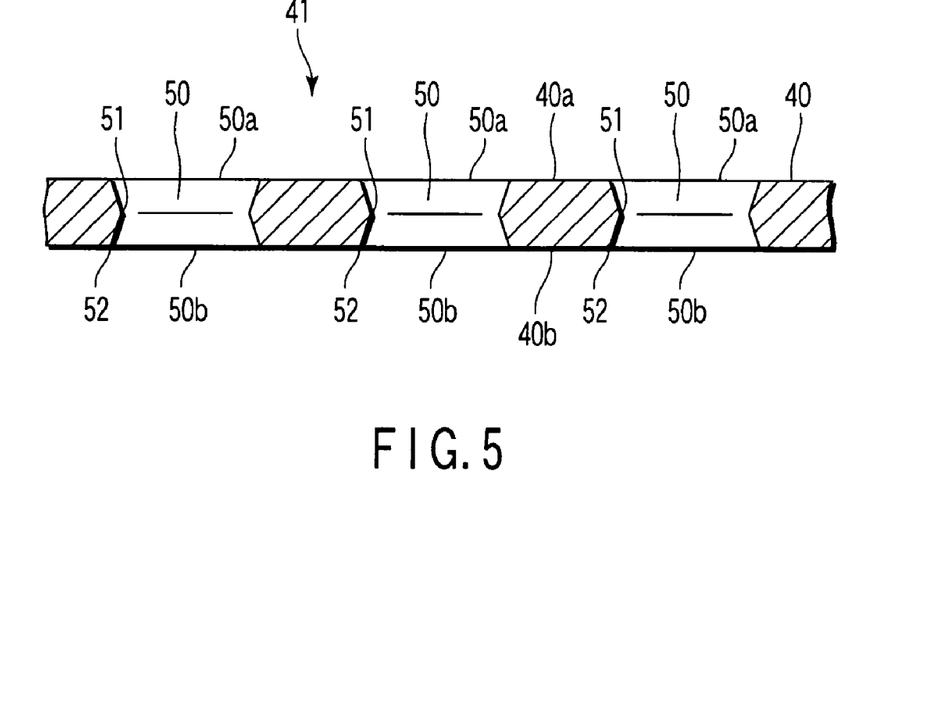
FIG. 5 is a sectional view of a porous plate according to a second embodiment of the present invention.

FIG. 5 shows a cross section of a porous plate 40 according to a second embodiment of the present invention in its thickness direction. In this embodiment, circulation holes 50 are formed by simultaneously etching a metal plate for use as the material of the porous plate 40 from both surfaces thereof. A smallest opening 51 of each circulation hole 50 is formed in a central part with respect to the plate thickness direction. The opening width of the circulation hole 50 increases from the smallest opening 51 toward an outlet port 50b, and the opening width is maximum at the outlet port 50b. Thus, in the present embodiment, both sides of the front and rear parts of the smallest opening 51 are tapered. According to the circulation holes 50 of the present embodiment, compared with those of the conventional punching-metal filter element, chips and the like can be separated more easily from the porous plate 40, so that clogging does not readily occur.

Figure 6:
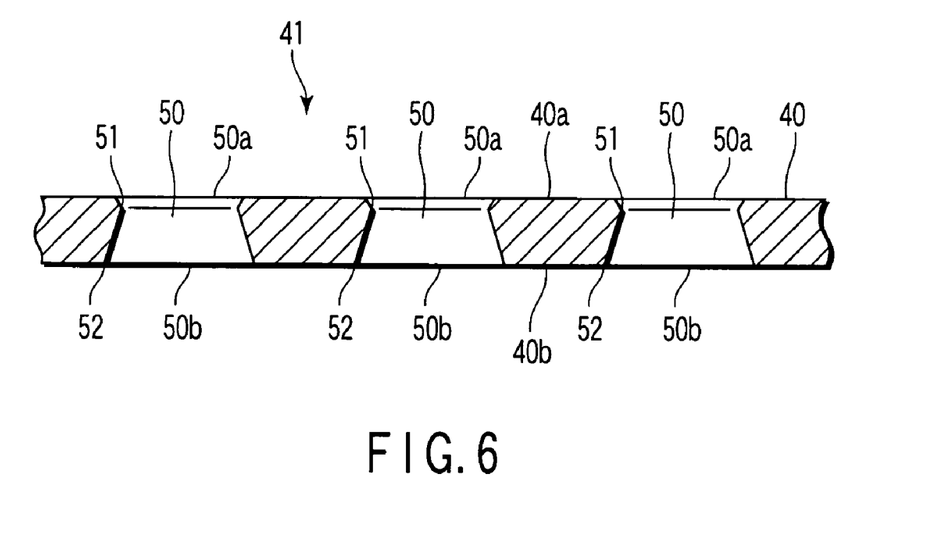
FIG. 6 is a sectional view of a porous plate according to a third embodiment of the present invention.

FIG. 6 shows a cross section of a porous plate 40 according to a third embodiment of the present invention in its thickness direction. A smallest opening 51 of each circulation hole 50 of this embodiment is formed in an intermediate part near an inlet port 50a with respect to the plate thickness direction. The opening width increases from near the inlet port 50a toward an outlet port 50b to form a tapered shape, and the opening width is maximum at the outlet port 50b. The porous plate 40 having these circulation holes 50 can also produce the same effect as the porous plate 40 of the first embodiment.

Figure 7:
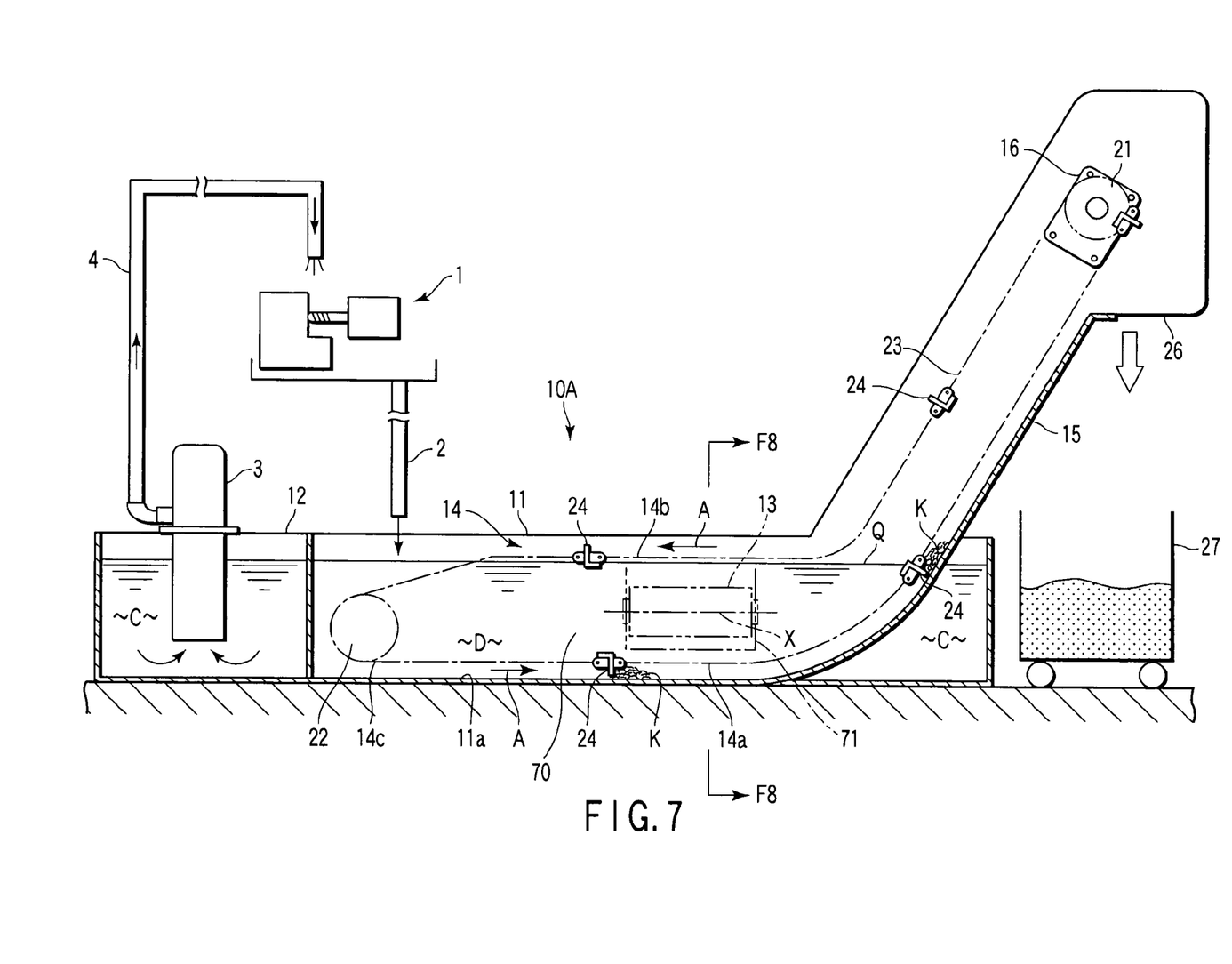
FIG. 7 is a sectional view of a filter device according to a fourth embodiment of the present invention.
Figure 8:
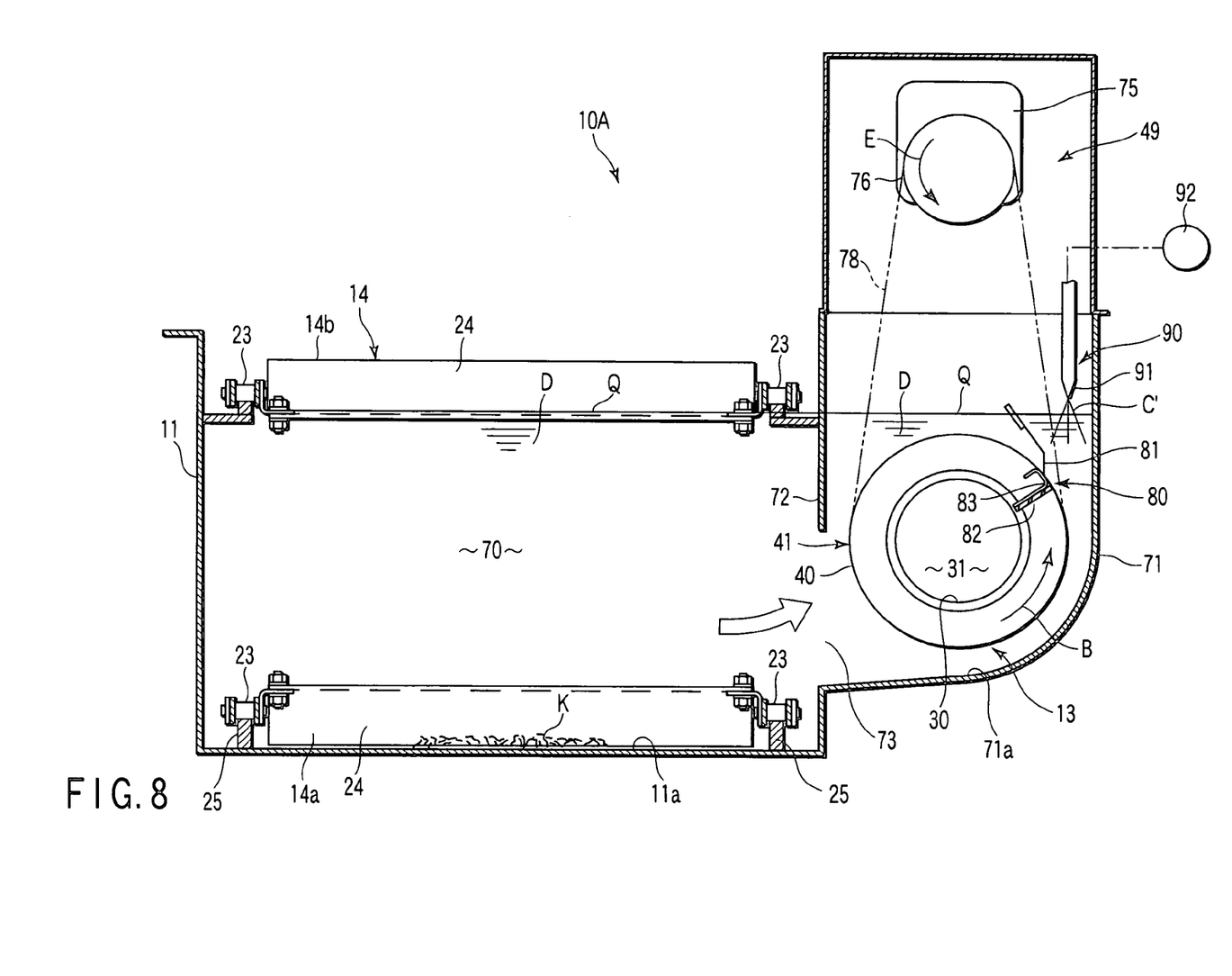
FIG. 8 is a sectional view of the filter device taken along line F8-F8 of FIG. 7.
Figure 9:
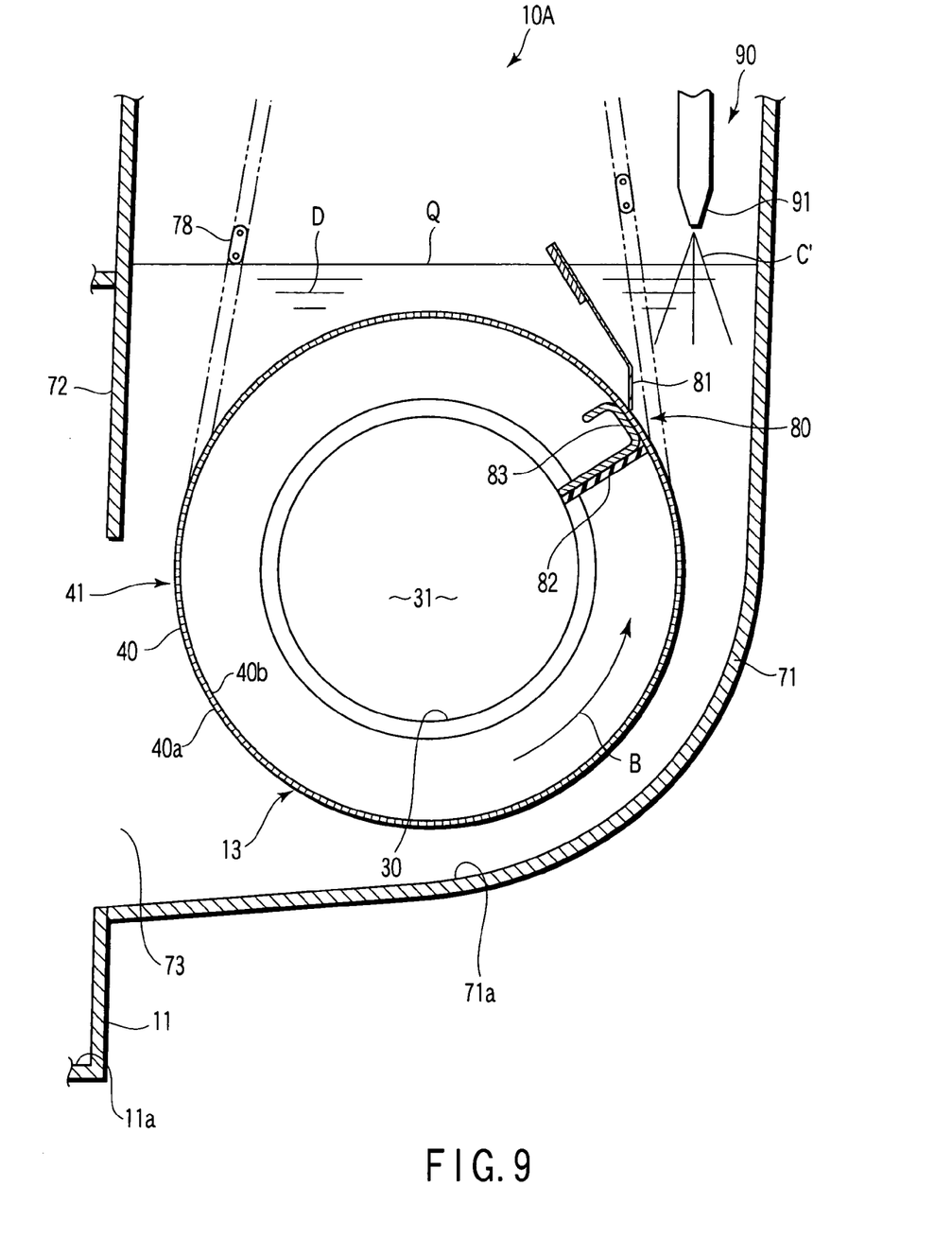
FIG. 9 is an enlarged view of a part of the filter device shown in FIG. 8.

FIGS. 7 to 9 show a filter device 10A according to a fourth embodiment of the present invention. Since the basic configuration and function of the filter device 10A are similar to those of the filter device 10 of the first embodiment, common numerals are used to designate portions common to the two devices, and a description of those portions is omitted. The following is a description of different portions.

A filter tank 11 of this filter device 10A includes a filter tank body 70, which accommodates a scraper conveyor 14, and a filter accommodation chamber 71 formed on the flank of the filter tank body 70. The filter accommodation chamber 71, which constitutes a part of the filter tank 11, is formed side by side with the filter tank body 70. As shown in FIG. 8, a partition plate 72 is provided between the filter tank body 70 and the filter accommodation chamber 71. A communication hole 73 is formed under the partition plate 72. The filter tank body 70 and the filter accommodation chamber 71 communicate with each other through the communication hole 73. Thus, a contaminated fluid D in the filter tank body 70 can flow into the filter accommodation chamber 71.

A filter drum 13 is located in the filter accommodation chamber 71. Since the configuration and function of the filter drum 13 are similar to those of the filter drum 13 of the first embodiment, a description thereof is omitted. The filter drum 13 shown in FIG. 7 is arranged horizontally in the filter accommodation chamber 71 so that the axis X (shown in FIG. 7) extends along the moving direction A of the scraper conveyor 14.

As shown in FIG. 8, a motor 75 is located over the filter accommodation chamber 71. The motor 75 causes a driving sprocket 76 to rotate in the direction indicated by arrow E. The filter drum 13 is provided with a driven sprocket (not shown). A power transmission member 78, such as a chain, is passed around and between the driving sprocket 76 and the driven sprocket. When the motor 75 rotates, therefore, the filter drum 13 rotates in the direction indicated by arrow B around the axis X. The motor 75, driving sprocket 76, and power transmission member 78 constitute the drive mechanism 49 for rotating the filter drum 13.

The filter drum 13 is formed into a cylindrical shape. A scraper blade mechanism 80 is provided near the outer peripheral surface of the filter drum 13. FIG. 9 enlargedly shows a part of FIG. 8. The scraper blade mechanism 80 includes a first scraper blade 81, a second scraper blade 82, a backup plate 83, etc. The distal end of the first scraper blade 81 extends in the direction of the axis X of the filter drum 13 in a manner such that it is in contact with or in close vicinity to the outer peripheral surface of the filter drum 13.

The second scraper blade 82 is formed of a plate-shaped material with rubber-like elasticity. The distal end of the second scraper blade 82 extends in the direction of the axis X of the filter drum 13 in a manner such that it is in contact with the inner peripheral surface of the filter drum 13. A bottom surface 71a of the filter accommodation chamber 71 declines toward a bottom portion 11a so that it can guide chips separated from the filter drum 13 toward the scraper conveyor 14.

The backup plate 83 is located inside the filter drum 13 and in a position corresponding to the distal end of the first scraper blade 81. The backup plate 83 extends in the direction of the axis X of the filter drum 13 and supports the filter drum 13 from inside. Both ends of the backup plate 83 are fixed to the filter accommodation chamber 71 by a frame member (not shown). The backup plate 83 prevents the filter drum 13 from being deformed when the filter drum 13 is pushed by the first scraper blade 81.

A fluid jet mechanism 90 is provided in the filter accommodation chamber 71. The fluid jet mechanism 90 includes a nozzle 91 and a fluid source 92. The nozzle 91 ejects a cleaned fluid C' toward a fluid surface Q above the scraper blade mechanism 80. The fluid source 92 supplies the cleaned fluid C' to the nozzle 91. The fluid C' is purer than the contaminated fluid D and is preferably decontaminated to the same degree as the cleaned fluid C. In the case of another embodiment without the scraper blade mechanism 80, the fluid jet mechanism 90 ejects the cleaned fluid C' to a region near the fluid surface Q in the filter accommodation chamber 71.

The following is a description of the operation of the filter device 10A.

The contaminated fluid D to be filtered is fed into the filter tank body 70. Large chips contained in the contaminated fluid D settle in the filter tank body 70 and are scraped out toward an exit section 26 by the scraper conveyor 14. The contaminated fluid D in the filter tank body 70 flows into the filter accommodation chamber 71 through the communication hole 73. The contaminated fluid D flows into an interior 31 of the filter drum 13 from the outer peripheral side of the filter drum 13. The cleaned fluid C that is decontaminated by the filter drum 13 flows into a clean tank 12 through an opening at an end portion of the filter drum 13.

Small chips that adhere to the outer peripheral surface of the filter drum 13 are scraped off by the scraper blade mechanism 80 as the filter drum 13 rotates. The scraped-off chips move along the bottom surface 71a of the filter accommodation chamber 71 toward the bottom portion 11a of the filter tank 11. These chips, along with relatively large chips K deposited on the bottom portion 11a, are discharged by the scraper conveyor 14.

The filter drum 13 of the present embodiment is contained in the filter accommodation chamber 71. The filter accommodation chamber 71 is formed on the flank of the filter tank body 70 with the partition plate 72 between them. The filter drum 13 is contained in the filter accommodation chamber 71 that is situated off the scraper conveyor 14. Since most of chips contained in the contaminated fluid D settle in the filter tank body 70, the amount of chips contained in the contaminated fluid D in the filter accommodation chamber 71 is relatively small. Therefore, the filter drum 13 can avoid being exposed to a large quantity of chips. Further, the filter drum 13 can also avoid contacting with large chips. Thus, the filter drum 13 can maintain satisfactory filtering performance.

According to the present embodiment, moreover, the cleaned fluid C' can be ejected to the region near the fluid surface Q in the filter accommodation chamber 71 by the fluid jet mechanism 90. Accordingly, lumps of sludge can be prevented from being formed neat the fluid surface Q, so that the filter accommodation chamber 71 can be kept decontaminated. Thus, the filter drum 13 can maintain further satisfactory filtering performance.

In carrying out this invention, it is to be understood that the components of this invention, including the specific shapes of the filter drum and circulation holes as well as the filter tank, may be embodied in variously modified forms without departing from the spirit of the invention. Further, a plurality of filter drums may be arranged in parallel with one another in the filter tank.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A filter device comprising:
   a filter tank stored with a contaminated fluid which contains chips;
   a filter drum rotatably disposed in the filter tank and immersed in the contaminated fluid; and
   a drive mechanism which rotates the filter drum around an axis of the filter drum,
   the filter drum including a filter element which is produced by forming a porous plate having a large number of circulation holes therein into a cylindrical shape, such that an inlet port of each said circulation hole opens in an outer peripheral surface of the porous plate and that an outlet port opens in an inner peripheral surface of the porous plate, the circulation holes of the porous plate being formed by etching and having a shape such that a smallest opening is formed in a cross section of the porous plate in a thickness direction thereof so that an opening width thereof is minimum between the inlet port and an intermediate part with respect to the plate thickness direction, that the opening width gradually increases from the smallest opening toward the outlet port, and that the opening width is maximum at the outlet port;

an exit section situated in a position higher than a fluid surface of the contaminated fluid in the filter tank and a scraper conveyor for scraping out chips settled on a bottom portion of the filter tank toward the exit section, said scraper conveyor including a lower portion which moves along the bottom portion of the filter tank toward the exit section and an upper portion which passes over the lower portion and returns to a starting end of the lower portion;

said filter drum being arranged horizontally between the lower portion and the upper portion of the scraper conveyor.

2. A filter device according to claim 1, wherein the inlet port is formed with the smallest opening and the outlet port is formed with a largest opening.

3. A filter device according to claim 1, wherein the circulation holes are circular, and the inside diameter of the smallest opening is greater than the thickness of the porous plate.

4. A filter device according to claim 1, wherein the filter drum is formed into a cylindrical shape, a scraper blade is located adjacent to an outer peripheral surface of the filter drum, and a distal end of the scraper blade extends in the direction of the axis of the filter drum so as to be in contact with or in close vicinity to the outer peripheral surface of the filter drum.

5. A filter device comprising:

a filter tank stored with a contaminated fluid which contains chips;

a filter drum rotatably disposed in the filter tank and immersed in the contaminated fluid; and a drive mechanism which rotates the filter drum around an axis of the filter drum, the filter drum including a filter element which is produced by forming a porous plate having a large number of circulation holes therein into a cylindrical shape, such that an inlet port of each said circulation hole opens in an outer peripheral surface of the porous plate and that an outlet port opens in an inner peripheral surface of the porous plate, the circulation holes of the porous plate being formed by etching and having a shape such that a smallest opening is formed in a cross section of the porous plate in a thickness direction thereof so that an opening width thereof is minimum between the inlet port and an intermediate part with respect to the plate thickness direction, that the opening width gradually increases from the smallest opening toward the outlet port, and that the opening width is maximum at the outlet port;

an exit section situated in a position higher than a fluid surface of the contaminated fluid in the filter tank and a scraper conveyor for scraping out chips settled on a bottom portion of the filter tank toward the exit section, scraper conveyor including a lower portion which moves along the bottom portion of the filter tank toward the exit section and an upper portion which passes over the lower portion and returns to a starting end of the lower portion;

said filter tank being provided with a filter tank body which accommodates the scraper conveyor and a filter accommodation chamber which is located side by side with the filter tank body beside the scraper conveyor; said filter drum being located in the filter accommodation chamber so that the axis of the drum extends along a moving direction of the scraper conveyor.

6. A filter device according to claim 5, wherein the filter drum is formed into a cylindrical shape, a scraper blade is located near an outer peripheral surface of the filter drum, and a distal end of the scraper blade extends in the direction of the axis of the filter drum so as to be in contact with or in close vicinity to the outer peripheral surface of the filter drum.

7. A filter device according to claim 5, further comprising a fluid jet mechanism which ejects a fluid toward a contaminated fluid in the filter accommodation chamber.

8. A filter device according to claim 6, further comprising a fluid jet mechanism which ejects a fluid toward a fluid surface of a contaminated fluid over the scraper blade.

9. A filter device according to claim 5, wherein the inlet port is formed with the smallest opening and the outlet port is formed with a largest opening.

10. A filter device according to claim 5, wherein the circulation holes are circular, and the inside diameter of the smallest opening is greater than the thickness of the porous plate.

* * * * *